United States Patent Office 3,022,771
Patented Feb. 27, 1962

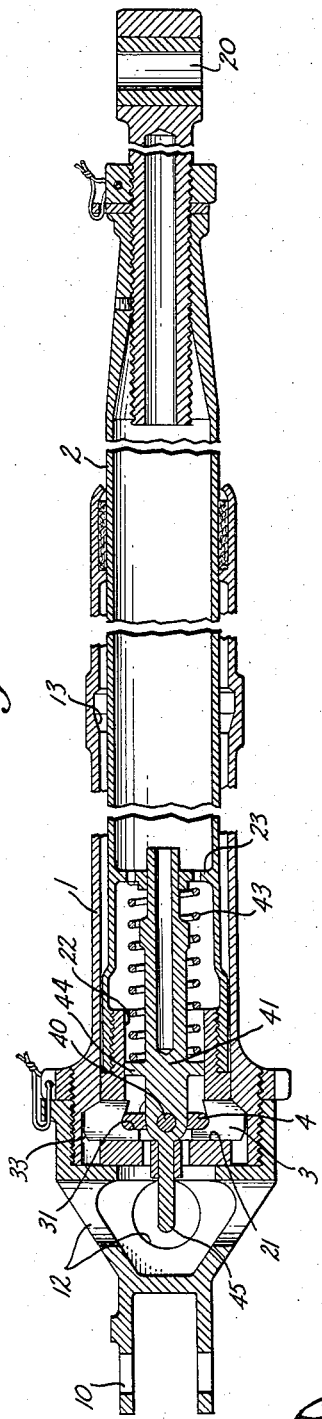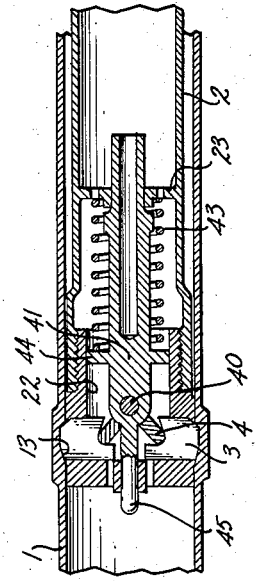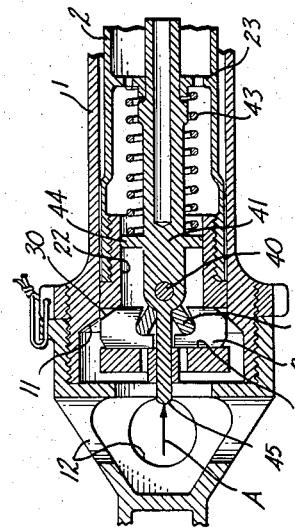

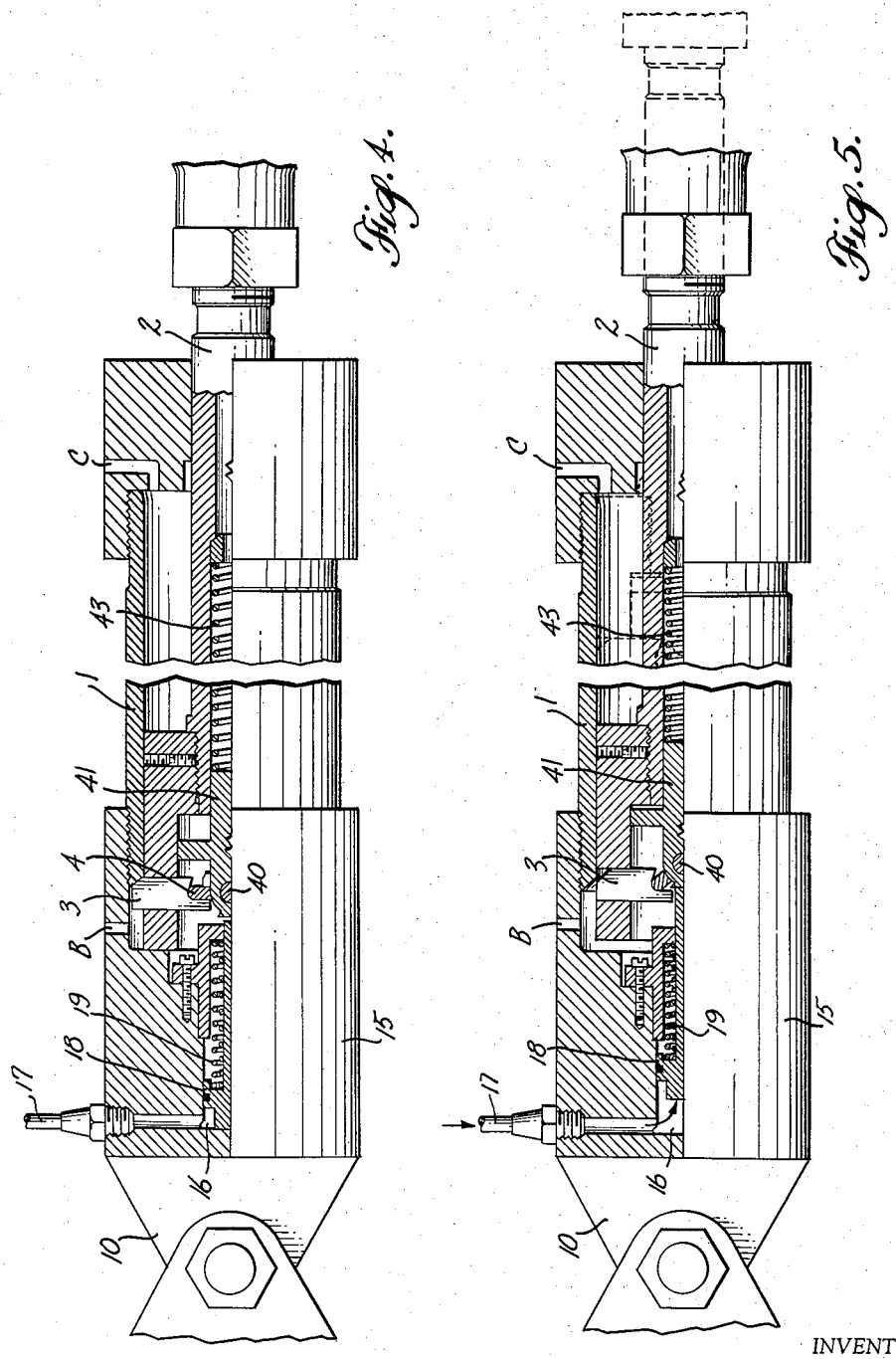

3,022,771
UNLOCKING MECHANISM FOR A TWO-PART EXTENSIBLE STRUT
Richard A. Chace, Bellevue, Wash., assignor, by mesne assignments, to Clemco Aero Products, Inc., Gardena, Calif., a corporation of Delaware
Filed Mar. 3, 1959, Ser. No. 796,908
4 Claims. (Cl. 121—40)

The patent to myself and George C. Newell, Jr., No. 2,744,501, dated May 8, 1956, discloses a hydraulic jack or strut with toggle locking devices, and a hydraulic device coupled with the strut and operable with initial access of pressure to the jack cylinder to unlock the locking devices and to effect immediately subsequent reciprocable movement of the strut elements relative to one another. It is not always desirable to effect such immediate relative reciprocation of the strut elements, yet it is desirable at times to unlock them so that they can be freely reciprocated relatively by hand or by subsequently energized mechanism from an initial position—fully contracted for example—to a different-extended-position, with the assurance that whenever they are returned to that initial position they will automatically lock again into the hydraulic mechanism, and remain locked. An instance where such a construction would be desirable is found where the strut constitutes part of a hydraulic closure-actuating mechanism for closing the wheel well of an aircraft undercarriage when air-borne and when ground-borne, and so must be reliably locked in the contracted condition during all normal hydraulic operation, but since such operation is by a hydraulic system, and it is undesirable to disable that system at any time, access to the wheel well for inspection or servicing can be gained by unlocking the strut elements for their free relative movement and for movement of the controlled closure, yet with the assurance that by return of the strut elements to their initial position the controlled closure will be automatically and properly connected in and actuated by the hydraulic system, through an indeterminate number of cycles, as though it were of a single element instead of two.

The invention is illustrated herein in two forms. Each comprises a "dry"-non-hydraulic-link of two parts, which can be relatively reciprocated manually when unlocked. A toggle lock of the general type disclosed in the patent above secures the two parts for movement and transmission of stress as one, in each of two opposite senses. In one form herein illustrated the lock is manually releasable, and in the other form the releasing is effected hydraulically. Following release and slight relative longitudinal movement the two parts are relatively reciprocable manually, for example, in either sense, but spring means act constantly on the toggle lock to return it to locked position upon return of the two elements of the link to their initial position. Following return and automatic relocking the link continues to function as a one-piece link, through any number of cycles, until release is again effected intentionally.

FIGURE 1 is a general axial sectional view of such a dry strut with parts shown in the locked position at one end, as the parts would be during all normal operation.

FIGURE 2 is a similar view of the locked end, showing parts at the instant of release.

FIGURE 3 is an axial sectional view of the interengaged portions of the extended components of the link, showing a mechanism for temporarily retaining parts in the extended position.

FIGURE 4 is a half axial sectional view and half elevation of a similar link intended for hydraulic unlocking, and showing parts in the locked position.

FIGURE 5 is a similar view showing parts at the instant of release.

The strut in this instance is illustrated as consisting of an external or guiding element 1 and an internal or guided element 2 in the form of concentric tubes mutually so guided as to be relatively axially movable. The guiding element 1 is arranged at one end 10 for securement to one part, for example, to linkage for moving a closure, and the element 2 is arranged at 20 for securement to another part, such as the closure itself, intended to be moved normally with the element connected at 10 but intended to be separable therefrom when required.

Assuming that the elements 1 and 2 are to be retained normally in the contracted relationship, although it would be equally feasible to maintain them normally extended, the element 1 is internally shouldered at 11 adjacent its end 10 for engagement by dog means such as the dogs 3 which are guided at 21 in the corresponding end of the element 2. The guidance of the dogs 3 is such that they move substantially radially outwardly into position to engage the shoulder 11, or inwardly so that they will clear the interior of the guiding element 1 and, in the latter position, the elements 1 and 2 may move relatively axially without obstruction. In accordance with the principles of the patent mentioned above, the shoulder 11 should be beveled and the tip of each dog would be beveled as indicated at 30 complementally to the bevel at 11, whereby release of the locking dog means is accomplished by relative axial movement between the elements 1 and 2 whenever the dog means 3 are free to move inwardly. In the broader sense, beveling of the shoulder and dog means are not essential to the functioning of the unlocking mechanism.

These dog means are moved outwardly and maintained in their outwardly projected locking positions by a toggle device including the links 4 pivotally mounted at 40 upon a slide 41 which is guided for axial movement within a recess 22 at one end of the element 2 and a shouldered element 23 at its opposite end. Spring means such as the helical spring 43 reacting between the shoulder 23 on the element 2 and a similar shoulder 44 on the slide 4 urges the slide axially outwardly of the inner end of the element 2, and tends to swing the toggle links 4 into the position of FIGURE 1 wherein they are aligned radially with the dogs 3, and to push the latter outwardly into their locking positions. A shoulder 31 on the dogs engages the toggle links and prevents movement of the latter materially past the radially aligned position.

It will be clear that so long as the elements 1 and 2 are fully contracted, the spring 43 will urge the dogs 3 outwardly into their locking position and will retain them there. When parts are thus interengaged the elements 1 and 2 move as one for transmission of compressional or tensional forces, through any number of cycles. Whenever it is desired to release the lock, it is only necessary to press the slide 41 to the right, as shown in the drawings, that is to say, in opposition to its spring 43, and to effect slight movement in the axial direction between the elements 1 and 2. One means of effecting such axial releasing movement of the slide 41 is to provide it with a protruding finger 45 accessible through apertures 12 in the head of the element 1 where it can be engaged by a finger and pressed to the right as indicated by arrow A in FIGURE 2. This rotates the toggle links 4 to a sufficient extent that they will suddenly collapse inwardly, and while there might be a positive pivotal connection between toggle links 4 and the dogs, there is preferably no positive connection between these toggle links and the dogs 3 for withdrawing movement of the dogs. The interengaged bevels 11 and 30 react with but slight pressure to the right of the element 2 relative to the element 1, whereupon the dogs 3 are withdrawn within the bore of the element 1 and thereafter may slide freely within the latter, being only pressed outwardly by the force of the spring 43 reacting through the inwardly rotated toggle links 4. The geometry of the toggle links is such that the outward pressure of the tips of the dogs against the bore of the part 1 is not appreciable, and the links may move quite freely in the axial direction relative to one another. The spring pressure is sufficient, however, that whenever the elements 1 and 2 are brought back to their initial fully contracted position, the toggle links will rotate outwardly and will force the dogs 3 outwardly, so that they will automatically and securely be engaged with shoulder 11, in the position of FIGURE 1.

Since it may be desirable to retain the elements temporarily in their extended relationship, a slightly angled shoulder 13 is provided at a desired location in the bore of the element 1 distant from the fitting 10, and the dogs 3 are provided with a complementally inclined shoulder which can engage with the shoulder 13 under the force of spring 43, and will furnish sufficient resistance to prevent accidental collapse of the strut, but whenever disengagement is required, it is only necessary to force the elements 1 and 2 slightly together and the shoulders 33 and 13 will disengage, and the elements 1 and 2 may again slide relatively freely with respect to one another. Parts are shown in FIGURE 3 in the position of temporary securement in extended position.

Although it is preferred that the movement of the elements 1 and 2 be controlled manually or at any event not hydraulically, nevertheless it is feasible to effect unlocking by hydraulic instead of purely manual means, which may be desirable when the link is inaccessible for manual release. Thus in FIGURES 4 and 5 the end 15 of the element 1 is formed with a cylinder 16 to which admits a supply line 17 for hydraulic fluid or the like, and a piston 18 is slidable therein to the right in opposition to its own compression spring means 19. The end of the piston is disposed in the vicinity of the end of the slide 41, when the parts are in their locked position. Whenever it is desired to unlock the parts, pressure fluid is admitted to the cylinder 16, urging the piston 18 to the right and engaging the slide 41 to urge this likewise to the right. Parts are shown in FIGURE 4 in the locked position and in FIGURE 5 in the position at the instant of unlocking. If desired, the movement of the strut elements 1 and 2 may be effected in this arrangement by pressure fluid admitted either at B or at C, or these may be merely vents to prevent trapping of air in either end of the bore of the element 1. Also, the temporary retaining shoulder 33 has been omitted from the dogs 3, although that might be provided, together with the complemental shoulder 13, if desired.

Reference has been made hereinabove to projection of the dogs 3 outwardly into their locking position, and their retraction inwardly. It is equally within the scope of this invention to project the dogs inwardly, and to retract them outwardly, and the terms used in the claims are to be understood as having such meanings, unless otherwise specified. Also, it is immaterial whether the locking dogs be mounted on one or on the other of the elements 1 and 2. The Bakke Patent No. 2,764,132 of September 25, 1956, shows one form of reversal of the arrangement of parts, and this and other rearrangements are within the scope of this invention.

I claim as my invention:

1. A strut comprising, in combination, a guiding element and a guided element relatively reciprocable throughout a given range of movement, one of said elements being shouldered, locking dog means mounted and guided in the non-shouldered element which is complemental to the shouldered element, for movement transversely of the direction of reciprocation between a projected locking position and a retracted unlocked position, for locking engagement of the projected tip of said dog means with the shoulder, and for free relative reciprocation of said elements when retracted, a toggle device operatively connected to said dog means and pivotally mounted upon the non-shouldered element for relative movement in the direction of reciprocation of the elements and for rotation from a locking position, aligned with the dog means, into a released position, out of such alignment, spring means urging said toggle device into the locking position, the shouldered element being formed with a closed cylinder, a piston reciprocable therein and having a plunger projecting from said cylinder towards the toggle device, but separate from the latter, and said cylinder being ported for connection to a pressure fluid source, to move the piston and plunger into engagement with the toggle device for movement thereof in the unlocking sense, and resilient means to return said piston and plunger to their initial position following release of pressure within the cylinder and unlocking movement of the toggle device.

2. A strut comprising, in combination, a guiding element and a complemental guided element relatively reciprocable freely throughout a given range of movement, one of said elements having a surface which is beveled with relation to the direction of reciprocation, locking dog means mounted and guided in the unbeveled element for movement transversely of the direction of reciprocation between a projected locking position and a retracted unlocked position, said dog means having a beveled tip surface complemental to the bevel of the cooperating element, and being positioned for locking interengagement of such beveled surfaces when projected into locking position, and for free relative reciprocation of said elements when retracted, a toggle device pivotally mounted upon the unbeveled element and operatively engaged with said dog means to project the latter into locking position as the toggle device rotates into alignment with the direction of movement of the dog means, and to free the dog means for retractive movement by reverse rotation of the toggle device, stop means to prevent material movement of the toggle device past such aligned position, a slide member guided in the dog-mounting element for movement in the direction of reciprocatory movement of such elements, and operatively connected to the toggle device to shift the latter from such aligned position, to free the elements for relative reciprocation, spring means reacting between the dog-mounting element and said toggle-shifting member, resisting its shifting from aligned position and continuously urging its return thereto, and means to initiate the latter's movement to disalign the toggle device, for subsequent relative reciprocation of the strut elements until the beveled shoulders return to registry, whereupon the spring means automatically relocks them.

3. A strut as in claim 2, wherein the beveled element is the guiding element, and its end protrudes from the like end of the guided element, said protruding end being transversely apertured, and the initiating means comprises an extension of the toggle-shifting member, disposed with its outer end within such aperture, for unlocking move- of the toggle-shifting member by manual pressure upon said extension.

4. A strut as in claim 2, wherein the unbeveled element is the guided element, and its end protrudes beyond the like end of the guiding element, a cylinder carried by said protruding end, disposed in alignment with the direction of reciprocation of the elements, a plunger within said cylinder and operatively connected to the initiating means, said cylinder and piston constituting the actuator means, and an extension of said piston constituting the initiating means operable to disalign the toggle device upon admission of pressure fluid to said cylinder.

References Cited in the file of this patent

UNITED STATES PATENTS

| | | |
|---|---|---|
| 1,842,776 | Bogoslowsky | Jan. 26, 1932 |
| 2,685,275 | Caldwell | Aug. 3, 1954 |
| 2,744,501 | Chace et al. | May 8, 1956 |
| 2,764,132 | Bakke | Sept. 25, 1956 |